May 30, 1967　　　J. H. GRADY　　　3,321,962
CALIBRATION INSTRUMENT
Filed March 15, 1965　　　2 Sheets-Sheet 1

INVENTOR
John H. Grady,
BY Watson, Cole, Grindle & Watson
ATTORNEYS

May 30, 1967 J. H. GRADY 3,321,962
CALIBRATION INSTRUMENT
Filed March 15, 1965 2 Sheets-Sheet 2
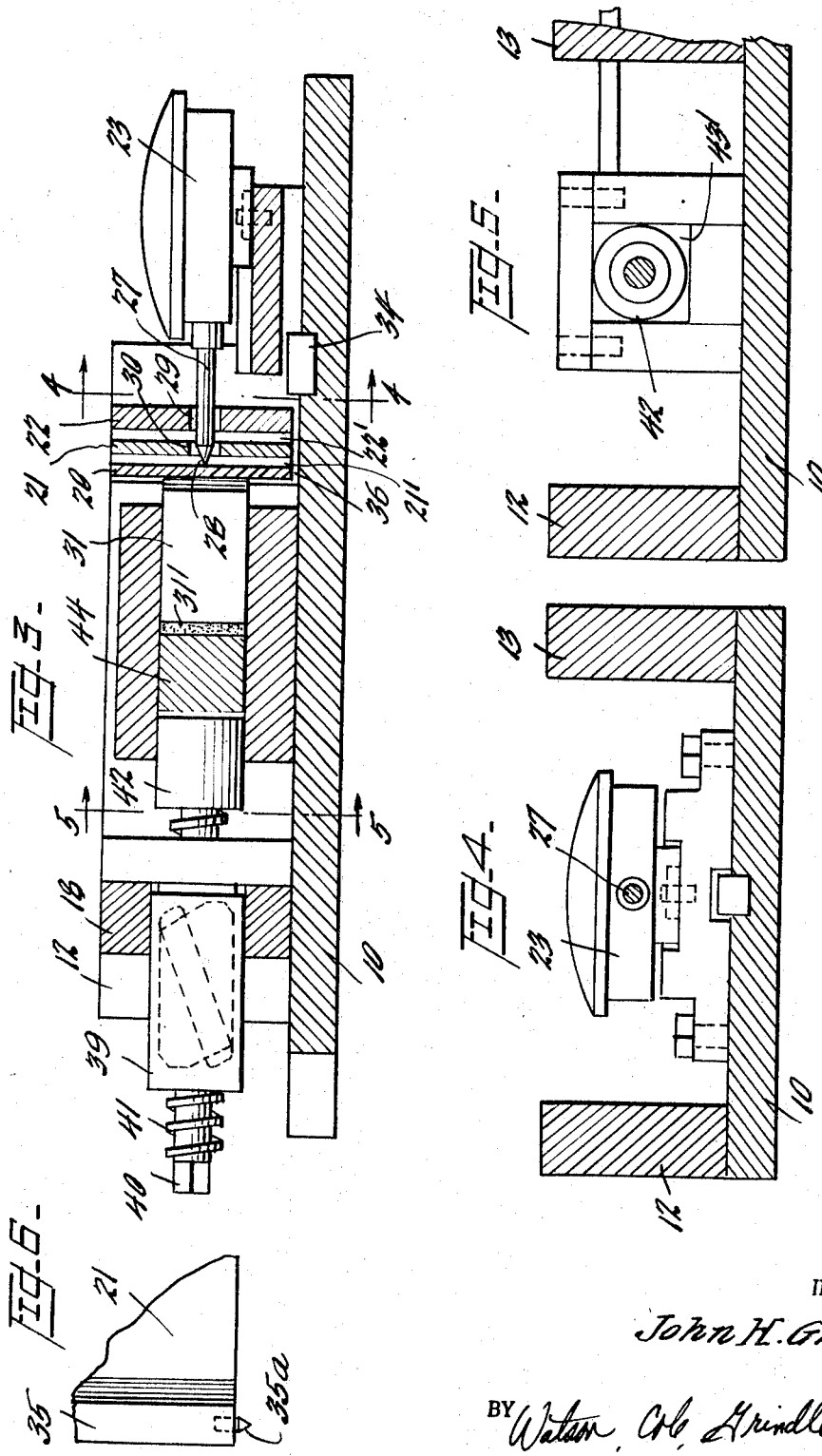
INVENTOR
John H. Grady,
BY Watson, Cole, Grindle & Watson
ATTORNEYS

United States Patent Office 3,321,962
Patented May 30, 1967

3,321,962
CALIBRATION INSTRUMENT
John H. Grady, Willimantic, Conn., assignor to Phillips Screw Company, Natick, Mass., a corporation of Delaware
Filed Mar. 15, 1965, Ser. No. 439,640
12 Claims. (Cl. 73—134)

This invention relates to calibration equipment and more particularly to a device for calibrating impact wrenches and power screw drivers.

In testing certain items of manufacture, for example, bits for power screw drivers, to ascertain the ultimate or failure strengths of such items, it is important that the stress applied be accurately and readily determined. As an instance, in the testing of driver bits for power screw drivers of the impact wrench type, the test is conducted by mounting the shank of the test bit in the driving end of the driver, engaging the driving end of the bit in a specified test block, turning on the driver and letting it impact until the bit fractures. In such a test the failure time in seconds is taken as the impact life of the bit under the specified test conditions.

However, in order to duplicate results, it is important to determine precisely the output of the driving tool, and a considerable effort was made to find suitable equipment for this purpose, with negative results.

Accordingly, it is an object of the present invention to provide a calibration device for measuring the output of rotary tools, and particularly low torque tools such as power screw drivers, impact wrenches and the like. More specifically, it is an object of the invention to provide such a device comprising a base, a flexure member supported on the base, a flexure indicator supported on the base and having a contact member engaging a face of the flexure member, a sliding member having one end adapted to contact the opposite face of the flexure member, a motion transfer device supported on the base in line with the sliding member and comprising means for converting rotary motion to motion having a linear component without substantial friction loss, means on one end of said motion transfer device for engaging the sliding member, and means on the other end of the motion transfer device for engagement with a rotary tool.

The motion transfer device may take the form of a ball bearing screw and nut combination, but any other combination of means for producing a similar result may be substituted for the said ball bearing screw and nut combination.

The flexure indicator may be calibrated in inch-pounds to indicate directly, at maximum deflection of the flexure member, the torque output of the tool being calibrated or, as in the case of the embodiment herein described and illustrated, it may measure only the extent of deflection of the flexure member. In this case, calibration of the power tool is completed by disengaging the tool, inserting a thrust bearing between the motion transfer device and the sliding member, engaging a torque wrench with the motion transfer device, and applying torque until the flexure member is deflected to the same extent, as shown by the indicator, as was the case when the power tool was used. In this case the torque may be read directly from the indicator of the torque wrench.

In order to prevent retrograde motion of the flexure member and motion transfer device, induced by the reaction of the flexure member between impacts, the rear end of the sliding member is provided with a friction surface to inhibit retrograde rotary movement of the motion transfer device. The static friction thus introduced between the sliding member and the motion transfer device does not, however, impose any limitation upon the degree of flexure attained through the successive impacts delivered by the rotary tool since the latter is allowed to run until the indicator hand has reached a maximum value, movements due to successive impacts having progressively decreased to zero at which point, of course, there is no friction loss.

Other and further objects, features and advantages will be apparent from the description which follows, read in connection with the accompanying drawings, in which:

FIGURE 3 is a vertical section on line 3—3 of FIGURE 1;

FIGURE 4 is a vertical section on line 4—4 of FIGURE 3;

FIGURE 5 is a vertical section on line 5—5 of FIGURE 3; and

FIGURE 6 is a fragmentary elevation showing a modified flexure plate.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Figure 1:
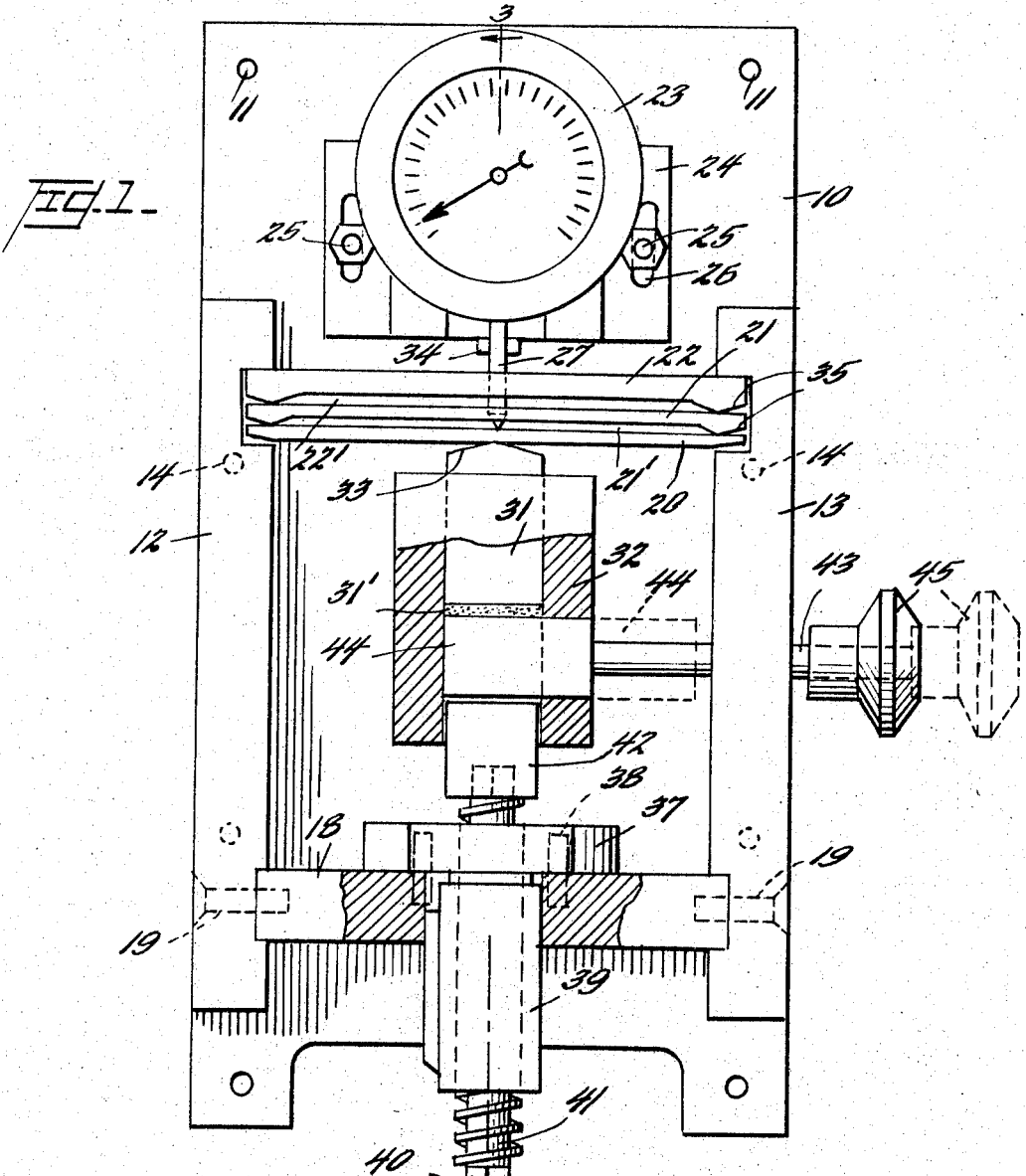
FIGURE 1 is a plan view of the present invention with parts broken away for the sake of clarity.
Figure 2:
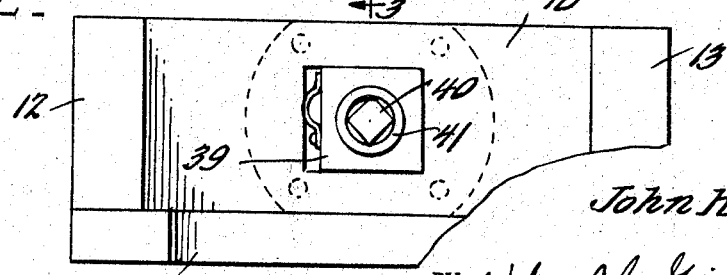
FIGURE 2 is a rear end elevation of the invention.

Referring to FIGURE 1, the device of the present invention comprises a flat base 10 of aluminum or other suitable material preferably provided with mounting holes 11 at its respective corners. Side rails 12 and 13 are secured to the base 10 by screws 14 or in any other suitable manner. The side rails 12 and 13 serve primarily to support cross-member 18, secured thereto by screws 19, and flexure plates 20, 21 and 22 in an upright position near the opposite end of the rails. An indicator 23 is mounted on a block 24 which is adjustably mounted on the base 10 by means of bolts 25 extending through slots 26 formed in the block 24. The indicator 23 has a contact member 27 provided with a nylon tip 28 (FIG. 3), the contact member extending through holes 29 and 30 in plates 22 and 21, respectively, with its tip 28 contacting the front face of flexure member 20. The nylon tip 28, which may be formed of other suitable material, is provided to dampen or reduce the tendency of the indicator needle to flutter under the influence of the successive impacts of the rotary tool being tested. A sliding member 31 is mounted in sliding relationship in a box-like guide 32 formed of flat stock suitably secured together, the front end of the sliding member 31 being provided with a radiused V-nose 33 to provide vertical line contact on the rear face of flexure member 20. Flexure plates 21 and 22 have clearance spaces 21' and 22' ground in their rear faces to allow each flexure member to deflect a certain distance before it makes contact with the next flexure member. An overload stop 34 mounted in a recess in the base 10 prevents the flexure members from deflecting beyond their elastic limit. The flexure plates 20, 21 and 22 are relieved at their ends, as at 35, to eliminate binding under deflection. The bottom edges of the flexure members or plates are ground to provide clearances 36 (FIG. 3) so that, except at their respective end portions, said bottom edges will not contact base 10 under deflection and the plates will give consistent and reproducible deflections at various torque values. If desired the flexure plates, instead of having their bottom edges ground, may be supported at their ends by pointed members 35a (FIG. 6), or balls, to completely eliminate any possible friction with the base 10. The overload stop 34 also serves to position the indicator mounting block 24 so that the tip 28 of the indicator will line up with the holes 29, 30 in the flexure members 22 and 21.

A motion transfer device such as a ball bearing screw and nut combination is mounted in a hole extending through the cross-member 18 by means of a mounting flange 37 and screws 38, the flange 37 being fast with the ball bearing nut 39. Such a ball bearing screw and nut combination is conventional and readily available on the market, and is adapted to incorporation in the present invention by providing the hex portion 40 on the rear end of the screw 41 for engagement with a power tool to be tested, and pinning a contact member 42 on the forward end of the screw 41, to rotate with the screw, a clearance being provided between the contact member and the screw for angular movement to compensate for any slight misalignment between the rear face of sliding member 31 and the forward end of the screw 41. The rear face of the sliding member 31 is formed by a friction piece 31', such as a piece of brake lining material, affixed to the rear end of sliding member 31, and serves the purpose of inhibiting retrograde rotary motion of the screw 41 and contact member 42, between impacts of the tool being tested, caused by the stress already imparted to the flexure members 20, 21 and 22. The flexure members are preferably of different thicknesses as shown, plate 20 being the thinnest, plate 21 next, and plate 22 the thickest. In this way, the sensitivity of the system is controlled to read low torque outputs very accurately and will nevertheless permit reading high torque outputs without exceeding the elastic limits of the flexure plates.

A rod 43 is slidably mounted in a suitable aperture through the rail 13 approximately midway of its length and carries on its inner end a block 44 supporting thrust bearing and, at its outer end, a handle 45. The thrust bearing support 44 is retractable through an opening in the side of the guide 32 to the dotted line position illustrated in FIGURE 1 when a power tool is being tested, so that the contact member 42 on the forward end of the screw 41 may come into direct contact with the friction piece 31' on the rearward end of sliding member 31. After the extent of flexure corresponding to the maximum torque of the tool under test has been determined, the tool is removed, the screw 41 is backed off to permit the flexure members to return to zero flexure and to provide room for the interposition of the thrust bearing between the contact member 42 and the friction piece 31'. A torque wrench is then applied to the rearward end of the screw 41 and torque is applied until the indicator reading is the same as that achieved by the power tool. The applied torque may then be read directly from the torque indicator of the torque wrench. The reason for using the thrust bearing in this procedure is, of course, to eliminate friction between the contact member 42 and the friction piece 31' so as to get a true reading of the torque necessary to produce the prescribed degree of flexure. As mentioned above, if the flexure indicator is calibrated in inch-pounds, the use of a torque wrench, as just described, may be dispensed with in which case the thrust bearing may be omitted from the device as described.

Having thus described the invention, what is clamed as new and desired to be secured by Letters Patent is:

1. A device for measuring the torque developed by rotary tools, comprising a base, a flexure member supported on said base and having front and rear parallel faces, a flexure indicator suported on said base and having a contact member engaging the front face of said flexure member, means restraining the ends of said flexure member from translation movement towards said indicator, a nonrotatable sliding member having front and rear ends and supported on said base for movement toward and in line with said contact member, said front end being adapted to engage the rear face of said flexure member, a frictionless nut fixed on said base in line with said sliding member, a screw member having front and rear ends and extending through said frictionless nut in line with sliding member, means on the front end of said screw for engaging said sliding member, and means on the rear end of said screw for engagement with a rotary tool.

2. A device according to claim 1, including means having a rearwardly directed friction face mounted on the rear end of said sliding member.

3. A device according to claim 1, including at least one further flexure member having front and rear faces and supported on said base forwardly of the front face of said first mentioned flexure member and apertured to accommodate said contact member, the rear face of each said further flexure member being spaced, over substantially its entire area, from the front face of the adjacent flexure member.

4. A device according to claim 3, the rear face of each said further flexure member having substantially the contacts with the front face of the adjacent flexure member.

5. A device according to claim 1, said front end of said sliding member being shaped to engage said flexure membe with substantially a line contact.

6. A device according to claim 1, including a thrust bearing movably supported on said base and movable into and out of a position between said sliding member and said means on the front end of said screw.

7. A device for measuring the torque developed by rotary tools, comprising a base, a flexure member supported on said base and having front and rear parallel faces, a flexure indicator supported on said base and having a contact member engaging the front face of said flexure member, means restraining the ends of said flexure member from translational movement towards said indicator, a nonrotatable sliding member having front and rear ends and supported on said base for movement toward and in line with said contact member, said front end being adapted to engage the rear face of said flexure member, a motion transfer device supported on said base in line with said sliding member and comprising a fixed member and means supported by said fixed member and having front and rear ends and movable relative to said fixed member without substantial friction to convert rotary motion to motion having a linear component, means on the front end of said movable means for engaging said sliding member, and means on the rear end of said movable means for engagement with a rotary tool.

8. A device according to claim 7, including means having a rearwardly directed friction face mounted on the rear end of said sliding member.

9. A device according to claim 7, including at least one further flexure member having front and rear faces and supported on said base forwardly of the front face of said first mentioned flexure member and apertured to accommodate said contact member, the rear face of each said further flexure member being spaced, over substantially its entire area, from the front face of the adjacent flexure member.

10. A device according to claim 9, the rear face of each said further flexure member having substantially line contacts with the front face of the adjacent flexure member.

11. A device according to claim 7, said front end of said sliding member being shaped to engage said flexure member with substantially a line contact.

12. A device according to claim 7, including a thrust bearing movably supported on said base and movable into and out of a position between said sliding member and said means on the front end of said movable means.

References Cited

UNITED STATES PATENTS

| | | | |
|---|---|---|---|
| 2,436,317 | 2/1948 | Manjoine | 73—141 X |
| 2,635,453 | 4/1953 | Gentry et al. | 73—1 |
| 3,115,029 | 12/1963 | Better | 73—1 |

OTHER REFERENCES

Rinkel, "A Gauge for Measuring Compression Force," Journal of Scientific Instruments, volume 24, November 1947, pages 298–299.

RICHARD C. QUEISSER, *Primary Examiner.*

C. A. RUEHL, *Assistant Examiner.*